US010728496B2

(12) United States Patent
Sakarya (10) Patent No.: US 10,728,496 B2
(45) Date of Patent: Jul. 28, 2020

(54) VIRTUAL TRANSPORTATION MACHINE

(71) Applicant: Taskin Sakarya, Ehringshausen (DE)

(72) Inventor: Taskin Sakarya, Ehringshausen (DE)

(*) Notice: Subject to any disclaimer, the term of this patent is extended or adjusted under 35 U.S.C. 154(b) by 156 days.

(21) Appl. No.: 14/392,395

(22) PCT Filed: Sep. 14, 2013

(86) PCT No.: PCT/EP2013/002769
§ 371 (c)(1),
(2) Date: May 2, 2016

(87) PCT Pub. No.: WO2015/036003
PCT Pub. Date: Mar. 19, 2015

(65) Prior Publication Data
US 2017/0264863 A1 Sep. 14, 2017

(51) Int. Cl.
*H04N 7/14* (2006.01)
*G06F 3/01* (2006.01)
(Continued)

(52) U.S. Cl.
CPC .............. *H04N 7/142* (2013.01); *G06F 3/011* (2013.01); *G06F 3/16* (2013.01); *H04N 13/388* (2018.05);
(Continued)

(58) Field of Classification Search
USPC ...................................................... 348/14.01
See application file for complete search history.

(56) References Cited

U.S. PATENT DOCUMENTS 6,327,020 B1 * 12/2001 Iwata .................... G03B 37/00
348/36
6,356,297 B1 * 3/2002 Cheng .................... H04N 19/00
348/36
(Continued)

*Primary Examiner* — Amal S Zenati
(74) *Attorney, Agent, or Firm* — King & Schickli, PLLC

(57) ABSTRACT

Now it is time to extend the capability of Internet to "Virtual Existence"; make a rapid change to "the 3D World", both in real and animation environment; start the new Era of "the instant travels"; "stop the wasted time" with many hours of travelling with cars and replace (reduce) the cars with the best alternative: "Task-Ins Cubicle". Task-Ins-Cubicle is "a round room", equipped with Monitors, Cameras, Speakers, and Microphones inside and outside, equipped inside with a Control Console, Internet Connection, and with possibly seating or laying arrangement. The Local Cubicle communicates with a Remote Cubicle placed anywhere in the world. A person in the Local Cubicle is able to feel everything of the Remote Cubicle. Persons at the Remote Task-Ins Cubicle are able to feel the complete holographic existence of the person from the Local Task-Ins Cubicle. Remote Task-Ins Cubicle can be replaced with a virtual Emulation World, to enable 3D Experience with Games and Imaginary Worlds. It is possible to call the Task-Ins-Cubicle as a "Virtual Transportation Machine". Local-Task-Ins-Cubicle allows virtual transportation to a Remote-Task-Ins-Cubicle at any remote place and at the same time allows another to transport itself from another Task-Ins-Cubicle to the Local-Task-Ins-Cubicle. Because Task-Ins-Cubicle does a complete round view of transmission in both directions, the walls of the Task-Ins-Cubicle at the remote site appears "transparent" so allowing a holographic viewing of the person or things inside. Task-Ins-Cubicle is a complete one solution for several usages at home: Working Office, Own Cinema Hall, Cinema, Concert Hall, Sport Hall, Travelling Vehicle, Meeting Cafe, Shopping Market, Gaming System, Emulation System, Learning School and even classical TV with full holographic viewing, and much more.

4 Claims, 4 Drawing Sheets

Cubicle A:
3-D virtual presence in the meeting room

Cubicle B / home location:
Complete „holographic appearance"of distant people (51) Int. Cl.
*H04N 13/39* (2018.01)
*H04N 13/388* (2018.01)
*G06F 3/16* (2006.01)
*G03H 1/22* (2006.01)
*H04N 7/15* (2006.01)

(52) U.S. Cl.
CPC ........... *H04N 13/39* (2018.05); *G03H 1/2294* (2013.01); *H04N 7/15* (2013.01); *H04N 2213/001* (2013.01)

(56) References Cited

U.S. PATENT DOCUMENTS

| | | | |
|---|---|---|---|
| 6,644,816 B1* | 11/2003 | Perra | G09F 19/18 348/115 |
| 6,836,286 B1* | 12/2004 | Tachi | H04N 7/15 348/36 |
| 7,136,090 B1* | 11/2006 | McDuffie White | G03B 15/10 348/14.16 |
| 7,905,610 B1* | 3/2011 | Shapiro | G06T 15/005 345/419 |
| 2004/0088077 A1* | 5/2004 | Jouppi | G06F 3/04815 700/245 |
| 2010/0208029 A1* | 8/2010 | Marti | G02B 27/01 348/14.02 |

\* cited by examiner

Figure 01: Form of the Task-Ins-Cubicle

Figure 02: Building Block of Task-Ins-Cubicle

Figure 03: Task-Ins-Communication

Cubicle A:
3-D virtual presence in the meeting room

Cubicle B / home location:
Complete „holographic appearance"of distant people Figure 04: General View of Local/Remote-Task-Ins-Cubicle

VIRTUAL TRANSPORTATION MACHINE

BACKGROUND OF THE INVENTION

Currently the public interest in real 3D TV and Video is rapidly increasing. The biggest problem in 3D viewing is the problem of conveying "depth info" to the viewer. Current TV & Video Trials achieve a "sense" of 3 D with giving two different pictures of the scene separately to each of the two eyes of the viewer. Separation is achieved either via polar-filter eye-glasses, or shutter eye-glasses or with even directional filtering of the light towards the eyes. But an important aspect to real-3D is still missing. The viewed pictures are "not complete". For example there are often missing legs, arms etc. of the person, or for example the sea view stops at the frame of the TV-monitor. This invention aims to achieve a real 3-D virtual world for the viewer.

The word "Home Cinema" means to be able to sit in a really acoustically good coupled big comfortable room, with a big screen in front for a good video view and for a good sound system, ideally coming out of 6+1 or more speakers. This is until now a luxury for the very rich. This invention aims to make a perfect Home Cinema for any body.

It is a life time wish for anybody to have a big nice office with a good view and with good working environment, to be able to enjoy working. Since we spend a very important part of our lives in Offices a good working environment is the most important in one's life. A big office with a view to sea, and with big PC Screens to work with, is a dream for many and only reality for a few top managers. This invention aims to enable the best possible office for any body.

Distance separates friends. Distance separates the loved ones. Distance breaks up good relations. This invention aims to minimize these bad affects of Distance.

Technology for telephony has made giant steps, such as mobile communication, SMS, MMS, Online-TV, Navigation and so on. But video-telephony was not able to improve. This invention aims to open the horizon for a communication more than just voice and video.

There are many of us searching for more excitement. There are some who lose their lives because they go over the limits or the meet the unexpected. The dangers are mostly for physically or mentally weak. This invention aims to give the full experience of excitement without any danger to the physical state of the viewer, except perhaps due to heart failure from the excitement.

Majority of people travel every day long distances to the working place. Many hours are wasted daily during travels. There is often very much stress due to travelling, driving, flying. This invention aims to minimize travelling, so the life time gained with it, could be used for more useful activity.

Meeting new people, person for lifetime, is mostly very difficult and sometimes the biggest barrier is the fear. Especially the women are very much afraid of their physical health in case they meet a total stranger. Another problem of meeting the right person is the information conveyed through current communication media i.e. pictures, phone call, letters are not good enough as meeting the person directly. This invention aims to enable one to one meeting with a new person or people without any physical danger at all.

Learning is a process best achieved in a university hall or in a conference room. Each new presentation done at university or at a conference or in a meeting is a potential source of learning. Problem is usually the cost of attendance. It is not only the cost of presentation, but often the travelling and overnight costs and the very much time lost during travelling. This invention will enable attendance to such learning and for University best attendance with remote learning, without the additional cost on travelling and overnight and without losing the time during travelling.

Disabled people are excluded from many human activities. Their disability is blocking them from taking part in activities such as education, travelling, communication, learning . . . . The aim of this invention to give the disabled a better chance to take part and enjoy their being.

Quality of Gaming has recently increased quite a lot. Lately there are attempts to combine 3D with gaming is growing. The games are trying to involve the player as one of the characters within the game itself. The aim of this invention is to achieve a virtual presence of the person within the game or within the virtual animated world.

Online sales are increasing enormously. One problem is still to have the right illumination and even testing of the device itself, before buying. 2D pictures do not give the same information one gets when one looks at the product within a market. The aim of this invention is to achieve better presentation of the online-products at home.

BRIEF SUMMARY OF THE INVENTION

This innovation relates itself to 3 different HW (Hardware), further to Communication format and protocol between these HW, further to Movement, Media and Interface Control, further to 4 different media used by these HW, further to Offline and Online Sharing of these Media and further to audio and video compression and finally to Safety and Privacy Handling.

Task-Ins-Cubicle is "a round room", equipped with Monitors, Cameras, Speakers, and Microphones inside and outside, equipped inside with a Control Console, Internet Connection, and with possibly seating or laying arrangement.

The Local Cubicle communicates with a Remote Cubicle placed anywhere in the world.

A person in the Local Cubicle is able to feel everything of the Remote Cubicle.

Persons at the Remote Task-Ins Cubicle are able to feel the complete holographic existence of the person from the Local Task-Ins Cubicle.

Remote Task-Ins Cubicle can be replaced with a virtual Emulation World, to enable 3D Experience with Games and Imaginary Worlds.

It is possible to call the Task-Ins-Cubicle as a "Virtual Transportation Machine".

Local-Task-Ins-Cubicle allows virtual transportation to a Remote-Task-Ins-Cubicle at any remote place and at the same time allows another to transport itself from another Task-Ins-Cubicle to the Local-Task-Ins-Cubicle.

Because Task-Ins-Cubicle does a complete round view of transmission in both directions, the walls of the Task-Ins-Cubicle at the remote site appears "transparent" so allowing a holographic viewing of the person or things inside.

Since the content of the innovation is wide, it is necessary to make solid definitions for each element and feature and describe them well. For this purpose following references are used.

A. Hardware: referred here as Task-Ins-Hardware
   1. HW-Task-Ins-Cubicle. The Cubicle of this invention is called "Task-Ins Cubicle" just as a matter of reference. Commercial Name can vary.
   2. HW-Task-Ins-Node
   3. HW-Task-Ins-Head-Cubicle
   4. Outside-Control-Console 5. Inside-Control-Console
6. Task-Ins-Sensors
7. Task-Ins-Mechatronics
B. Portal: referred here as Task-Ins-Portal
1. Task-Ins-Registration-Portal
2. Task-Ins-Communication-Portal
3. Task-Ins-Download-Portal
4. Task-Ins-Meetings-Portal
C. Communication: referred here as Task-Ins-Communication
1. Protocol-Task-Ins-Cubicle-Communication
2. Protocol-Task-Ins-Node-Communication
3. Task-Ins-Telephony
4. Task-Ins-HMI
D. Movement and Interface: referred here as Task-Ins-Interface
1. Task-Ins-Conversation
2. Task-Ins-Ext-AVC-Interface
3. Task-Ins-Int-AVC-Interface
4. Task-Ins-Gaming-Interface
5. Task-Ins-Movement
6. Task-Ins-Recording-Playing
E. Media: referred here as Task-Ins-Offline-Media
1. Task-Ins-Virtual-Office
2. Task-Ins-Virtual-Cinema
3. Task-Ins-Virtual-Scenes
4. Task-Ins-Virtual-Games
F. Media-Sharing: referred here as Task-Ins-Media-Sharing
1. Task-Ins-Media-External
2. Task-Ins-Media-Remote
3. Task-Ins-Media-Meeting
G. Format: referred here as Task-Ins-AV-Compression-Format
1. Task-Ins-Video-Format
2. Task-Ins-Audio-Format
3. Task-Ins-AV-Compression
H. Safety and Privacy: referred here as Task-Ins-Safety-Privacy
1. Task-Ins-Authentication
2. Task-Ins-Encryption
3. Task-Ins-Interrupt
I. 4D Elements: Task-Ins-4D-Elements
1. Task-Ins-Cubicle-Physical
2. Task-Ins-Cubicle-Climate
3. Task-Ins-Cubicle-Scent
J. Other: Related Other Definitions and Descriptions
1. 5D-Concept
2. Invisible Walls
3. Both Ways Virtual Transportation
4. Terms used within this invention
5. Interesting Usage Scenarios
6. "fish-eye" and inner concave objectives on the cameras
See "detailed description" for more info on these.

BRIEF DESCRIPTION OF THE SEVERAL VIEWS OF THE DRAWINGS

FIG. 1: Form of the Task-Ins-Cubicle

This figure shows ideal, practical, compromised forms of Task-Ins-Cubicle. It displays just as for example a seat in the middle. Again just as for an example and for the cylindrical form, a box of bottom with radius 120 to 140 cm and height of 220 to 240 cm could be used.

FIG. 2: Building Block of Task-Ins-Cubicle

This figure shows an example of a practical building block for Task-Ins-Cubicle. Its example size is 60 to 70 cm×110 to 120 cm, i.e. 50 inch concave monitor inside with a camera, a microphone and a speaker; and 50 inch convex monitor outside again with a camera, a microphone and a speaker.

Example model requires 16 of these building blocks plugged-in-each-other to shape the practical form of the Task-Ins-Cubicle. Instead of using a plug-in system, the blocks can also be connected wireless as example via Bluetooth and via WLAN to each other to distribute the images to be displayed.

FIG. 3: Task-Ins-Communication

This figure shows multiplexing of Audio-Video at Local-Task-Ins-Cubicle and de-multiplexing of AV at the Remote-Task-Ins-Cubicle. It shows also the AV way, i.e. from inside Local-Task-Ins-Cubicle to outside Remote-Task-Ins-Cubicle.

FIG. 4: General View of Local/Remote-Task-Ins-Cubicle

This figure shows an example display from Local-Task-Ins-Cubicle and from Remote-Task-Ins-Cubicle in a Meeting Room.

DETAILED DESCRIPTION OF THE INVENTION

Task-Ins-Cubicle is a complete one solution for several usages at home: Working Office, Own Cinema Hall, Cinema, Concert Hall, Sport Hall, Travelling Vehicle, Meeting Café, Shopping Market, Gaming System, Emulation System, Learning School and even classical TV with full holographic viewing, and much more.

A. Task-Ins-Hardware:

HW-Task-Ins-Cubicle: HW-Task-Ins-Cubicle is "a round room", equipped with Monitors, Cameras, Speakers, and Microphones inside and outside, equipped inside with a Control Console, Internet Connection, and with possibly seating or laying arrangement.

Innovation lays in the art the cubicle is built with cameras and monitors such that it enables a virtual existence of the person or things within local cubicle at the remote site.

Figure 01:
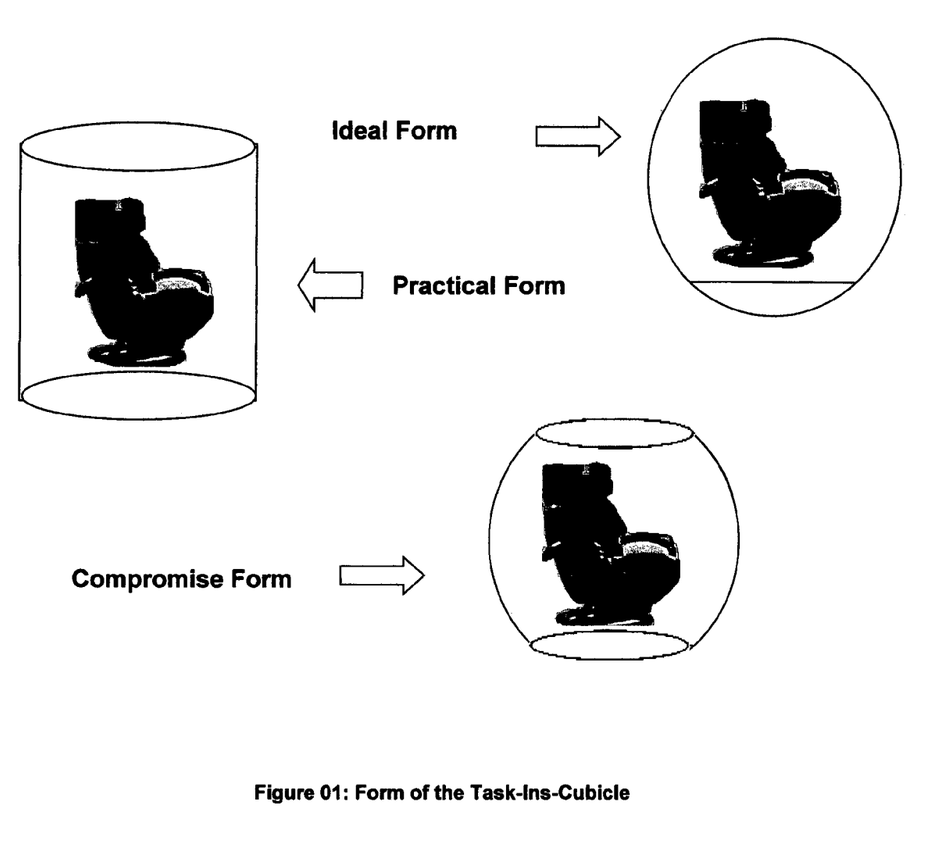

Task-Ins-Cubicle is to reduce the needs for travelling i.e. high dependency on cars. Analogues to the cars, the Task-Ins-Cubicle shall have different sized and equipped models in the future. A size of the Task-Ins-Cubicle shall vary depending on if it is used by one or more people at the same time. A typical expected size is given under FIG. 1 description.

Ideally Task-Ins-Cubicle will have a spherical form. However, from space and usage point of view, a cylindrical form could be more practical. On the other hand the ideal form, i.e. the spherical form ensures almost equal distance from the head of the person or things placed inside, at all points. With this equal distancing, best possible video and audio viewing shall be possible.

Figure 02:
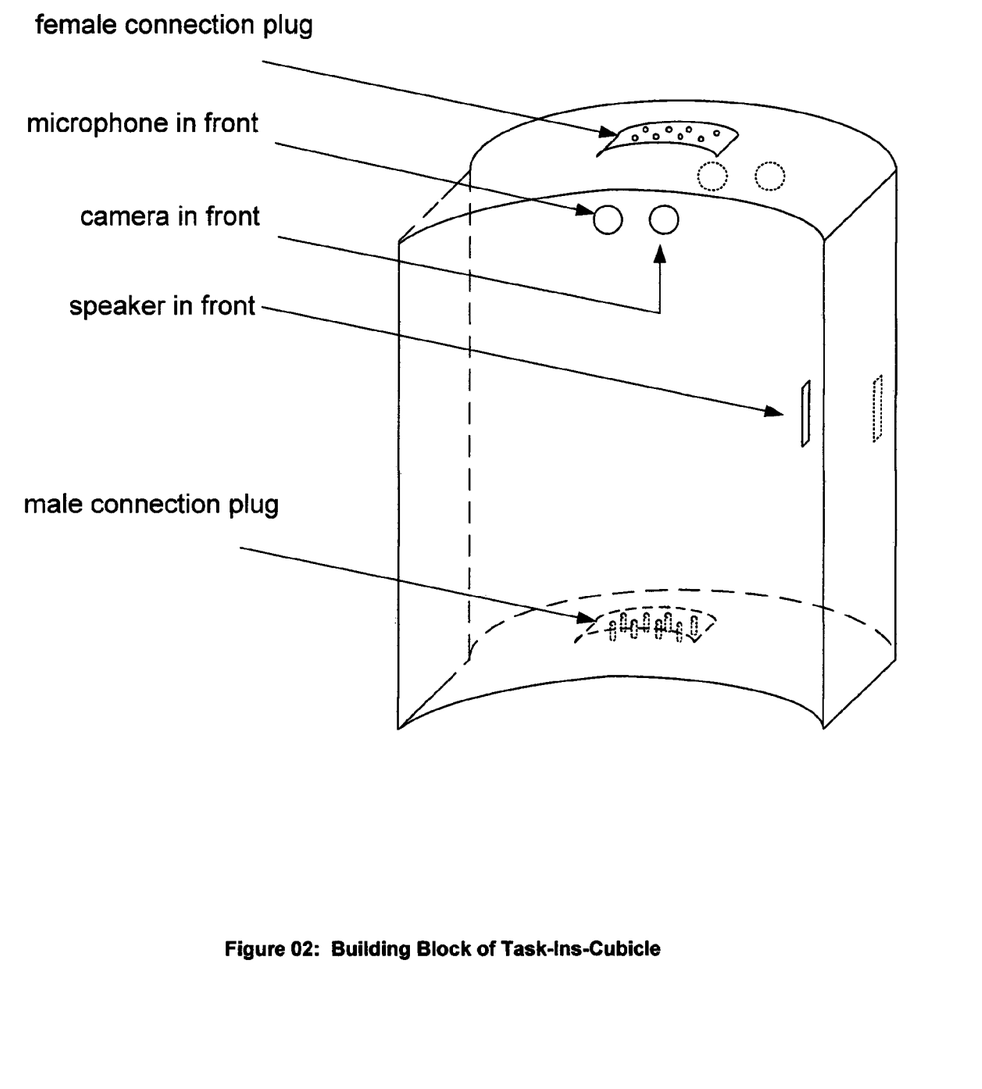

Ideally a Task-Ins-Cubicle will have one monitor covering the whole "room" internally and one monitor covering the whole "room" externally. But practically and from today's technologically handling point of view, Task-Ins-Cubicle shall be first made up of a number of a building block covered with a monitor, a camera, a microphone and a speaker inside and outside. FIG. 2 displays an example of such a building block.

When the number of cameras increase then the 3D viewing quality shall increase too. Eventually instead of using separate cameras, the way the monitor is built shall be changed, in such a way that a display point (pixel) will have another point to receive and store the light info at this point. Then this light info shall be communicated one to one to a point on the coupled Task-Ins-Cubicle. This way the holographic picture perception shall be perfect. In this patent, this point then is referenced as "light-detection-point" and the info transfer of such is referenced as "point-to-point-light-info-transmission". This is as a future alternative to the camera usage.

Figure 03:
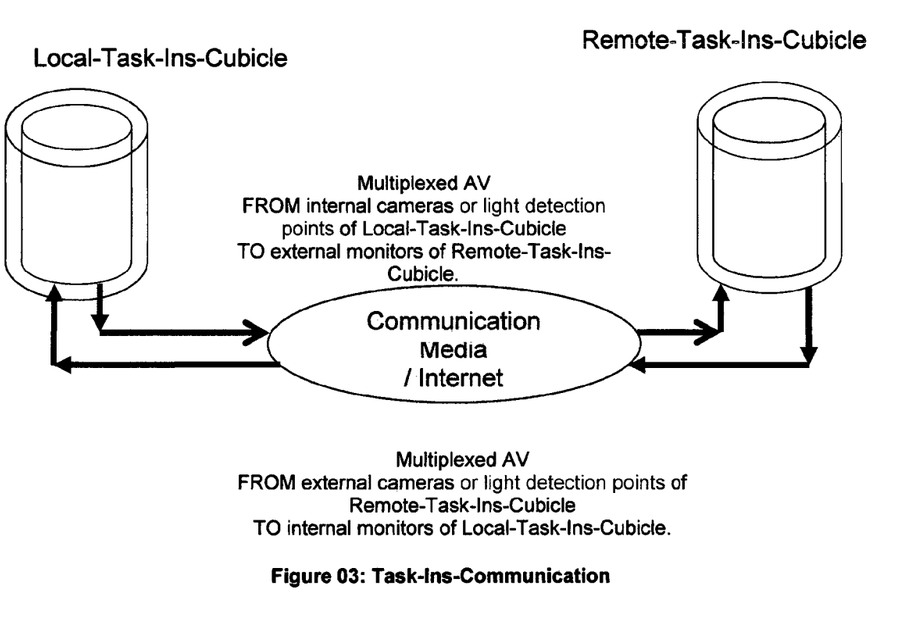
Figure 04:
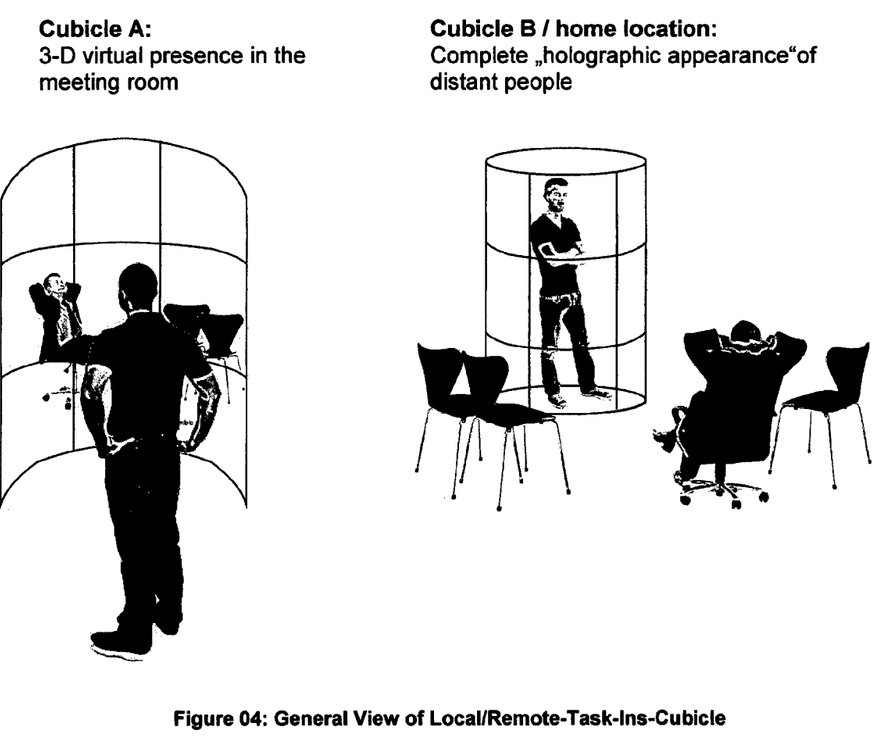

Size and shape of such a building block depends on the form of the Task-Ins-Cubicle. FIG. 3 displays a form for a Cylindrical-Task-Ins-Cubicle. 16 such blocks are needed to make up the Task-Ins-Cubicle.

HW-Task-Ins-Node: HW-Task-Ins-Node is a round spherical box equipped with Cameras and Microphones outside.

HW-Task-Ins-Eye-Cubicle: HW-Task-Ins-Eye-Cubicle is a helm around head with complete round monitors and a compass for directional info displays.

Inside-Control-Console: A control panel inside the Cubicle to do controlling of the Cubicle, such as switching on/off, accepting incoming calls, to be able to select an AV-Control source to connect to it and to be able to communicate with internet-portals; and to be able to send and receive control commands, and for these purposes to produce Task-Ins-Control Information.

Outside-Control-Console: Similar to Inside-Control-Console, except this is outside Task-Ins-Sensors: Task-Ins-Hardware is equipped with several sensors such as climate information detection (temperature, humidity, wind etc.), light density, Location Info (for example GPS), movement direction, speed, scent detection and similar. The Task-Ins-Sensor results are added to the "control" part of the Task-Ins-AV-Control generated at the Task-Ins-Hardware.

Task-Ins-Mechatronics: Task-Ins-Hardware is equipped with electronic and mechanical devices and interfaces to such devices, such that it is possible to extend capability of the virtually transported person to control these mechatronic parts. Just for example, movement of the cubicle, movement direction, controlling an external video player, controlling a robotic arm for example for production in factory or for remote driving or flying, etc.

B. Task-Ins-Portal:

Task-Ins-Registration-Authentication-Portal: Task-Ins-Registration-Portal handles first time registration of each new Task-Ins-Cubicle. Addressing scheme is based on telephonic addressing schemes of the countries, city and areas.

For each Cubicle a fixed address is allocated. This address resolves itself to an Internet IP address either as a fixed IP address or a dynamically allocated IP Address.

Task-Ins-Communication-Portal keeps track of each cubicle address versus IP-Address. Whenever a Task-Ins-Cubicle is switched on, it communicates with Task-Ins-Communication-Portal to inform about the allocated IP-Address.

Task-Ins-Cubicle is allowed to set one or more sets of "user-name" and "user-password". Local-Task-Ins-Cubicle is to know the private credentials of the Remote-Task-Ins-Cubicle. Exception is the public Remote-Task-Ins-Cubicles, for which no authentication-credentials are necessary.

Task-Ins-Communication-Portal: Each time a Task-Ins-Cubicle wants to communicate with another Cubicle or Node, it makes a connection request to the Task-Ins-Communication-Portal. Task-Ins-Communication-Portal checks first the communication status of the requested cubicle. If it is ok, then it communicates with the Task-Ins-Registration-Authentication-Portal to see if such a communication is allowed and to get the IP-Address of the destination.

Task-Ins-Communication-Portal keeps track of occupancy status of each cubicle. I.e. such as free-inside-outside, free-inside, free-outside, occupied.

Task-Ins-Communication-Portal keeps only limited-encrypted-data over the communication of cubicles for safety reasons.

Task-Ins-Download-Portal: Task-Ins-Download-Portal allows Task-Ins-Offline-Media downloads to Task-Ins-Cubicles.

Task-Ins-Meetings-Portal: Task-Ins-Meetings-Portal accepts Task-Ins-Cubicle-Virtual-Transportation calls to bring a number of people together in a meeting place. The meeting place can be either real or virtual. Examples of a meeting place would be cafes, at a real or virtual scene, a meeting room and similar.

C. Task-Ins-Communication:

Task-Ins-Cubicle-Communication: Task-Ins-Cubicle-Communication is responsible for handshake in between cubicles for a connection-setup, regulating communication speed, controlling audio-video-compression and stopping the connection.

Task-Ins-Cubicle-Communication is responsible for other control functions too. The other control functions such as for example, movement information, climate information, external video source information, are sent from one cubicle to another via control-messages defined for these functions.

Task-Ins-Node-Communication: Protocol-Task-Ins-Node-Communication handles similar functions as in Protocol-Task-Ins-Cubicle-Communication, except it communicates with multiple cubicles or head-cubicles. It does not regulate communication speed.

Task-Ins-Telephony: Task-Ins-Telephony handles the similar functions as in Protocol-Task-Ins-Cubicle-Communication. It addition it enables a possibility to have an incoming holographic view of the caller and ability to accept, deny, interrupt communication and pre-recorded multi-media viewing as short response and the possibility to record incoming media. So this is analogous with a typical answering-machine actions but with Task-Ins-Video-Audio.

Task-Ins-HMI: Task-Ins-HMI defines the human machine interface of Task-Ins-Cubicle. HMI Interfaces are available at Cubicle-Internal and Cubicle-External Control Consoles.

D. Task-Ins-Interface:

Task-Ins-Cubicle and Task-Ins-Node have interface modules to enable control of these by the users. Following typical interfaces are considered within the concept of this application. The interface scope shall be increased as the need arises.

Task-Ins-Conversation: Task-Ins-Conversation is a built in main function of Task-Ins-Cubicles via directional microphones, directional speakers and directional cameras.

Task-Ins-Ext-AVC-Interface: Task-Ins-Ext-AVC-Interface enables attachment and control of external audio video sources such as TV and external media players, from within the Task-Ins-Cubicle.

Task-Ins-Int-AVC-Interface: Task-Ins-Int-AVC-Interface enables Local-Task-Ins-Cubicle-Media to be provided to external players or displays, for example via a projector.

Task-Ins-Gaming-Interface: Task-Ins-Gaming-Interface enables attachment and control of different gaming systems from within the Task-Ins-Cubicle. This also includes control of gaming pieces such as a for example tennis racket, a gun etc. . . .

Task-Ins-Movement: Task-Ins-Movement gives movement capability to the Task-Ins-Cubicle, where such a movement is allowed and is possible. Local-Task-Ins-Cubicle has a walking-band at the bottom, where walking movement, speed and direction information is sent to the remote side to be able to move the Remote-Task-Ins-Cubicle in the indicated direction and with the speed sent.

Task-Ins-Recording-Playing: Task-Ins-Cubicles are equipped with a very high capacity memory module. It can record many hours of Task-Ins-Multi-Media. The media can be replayed afterwards.

E. Task-Ins-Offline-Media:

Task-Ins-Virtual-Office: Task-Ins-Virtual-Office is audio-video media from different real or virtual offices. This media enables Task-Ins-Cubicle as a Work-Office of best choice. Video and Audio control is done with own selectable big virtual monitors Task-Ins-Virtual-Cinema: Task-Ins-Virtual-Cinema is audio-video media from different real or virtual cinema halls. This media enables own cinema hall at home. External Video and Audio control from for example from TV or external AV is done on the big screen of the cinema screen. 3D-Films can be shown.

Task-Ins-Virtual-Scenes: Task-Ins-Virtual-Scenes is audio-video media from an imaginary world or from a pre-recorded real world. Playing of this media at Task-Ins-Cubicle enables virtual travels to these virtual worlds. Also stories such as cinema films can also be recorded and played as Task-Ins-Virtual-Scenes.

Task-Ins-Virtual-Games: Task-Ins-Virtual-Games is audio-video media of different gaming or sporting animation with ability to interact from Task-Ins-Cubicle.

F. Task-Ins-Media-Sharing:

Task-Ins-Media-External: Task-Ins-Media-External is just a usage form of a normal Task-Ins-Cubicle-To-Cubicle communication, in that at remote-Cubicle-site, an external media player is running.

Task-Ins-Media-Remote: Task-Ins-Media-Remote is the ability to play the media of the Local-Task-Ins-Cubicle at the remote site, for example either at an external monitor or on a screen via an external projector.

Task-Ins-Media-Meeting: Task-Ins-Media-Meeting is meeting of 2 or more Task-Ins-Cubicles in a prepared room with a screen for displays. Each Cubicle can play own media.

G. Task-Ins-AV-Compression-Format:

Task-Ins-Video-Format: Task-Ins-Video-Format multiplexes several (typically 16) directional video screens. Each screen has a header with further info on the format, compression used, size and resolution. Task-Ins-Video-Format allows full flexibility in that each scene can have a different video-format, can utilize different compression techniques and can have different resolution and video sizes Task-Ins-Audio-Format: Task-Ins-Audio-Format is similar to the Task-Ins-Video-Format in structure.

Task-Ins-Video-Compression: Task-Ins-Video-Compression utilizes an improved new version of H.264, in that variable pattern recognition and filtering is used.

Task-Ins-Audio-Compression: Task-Ins-Audio-Compression utilizes an improved new version of MP3.

H. Task-Ins-Safety-Privacy:

Task-Ins-Authentication: Local-Task-Ins-Cubicle sends authentication credentials i.e. a "user-name" and "user-password" within a "Connection-Request" to the Task-Ins-Communication-Portal. Only when the credentials are accepted, the connection request is sent to the Remote-Task-Ins-Cubicle, with the credentials. Remote-Task-Ins-Cubicle makes a double check on the credentials before allowing further communication handshake.

Task-Ins-Encryption: AV Media in between Task-Ins-Cubicles is completely encrypted such that recording by third parties could not disturb the privacy of such communication. Exception to this is the communication from Task-Ins-Node to Task-Ins-Cubicles, i.e. not encrypted.

Task-Ins-Interrupt: It is possible to break-up the Task-Ins-Communication locally or remotely. Task-Ins-Interrupt has also protocols integrated to achieve protection against unwanted and criminal activity. Just for a couple of examples, an obscene act within public, or a threatening activity. In such cases, not only connection-close but communication-disorder-record can be entered, for further tracking of such activity.

I. Task-Ins-4D-Elements:

To be able to increase the real time experience of the person within the Local-Task-Ins-Cubicle, 4D elements are introduced within the Local-Task-Ins-Cubicle. However, the 4D elements are never to endanger health of the person within the cubicle.

Task-Ins-Cubicle-Physical: Movement within the Remote-Task-Ins-Cubicle is communicated to the Local-Task-Ins-Cubicle in such a way that bottom part of Cubicle or the seating arrangement is able to make corresponding small movements.

Task-Ins-Cubicle-Climate: Local-Task-Ins-Cubicle is equipped to change the climate within the cubicle corresponding to the climate conditions at the remote site. These are currently communicated as temperature change and as directional air movement i.e. wind.

Task-Ins-Cubicle-Scent: Local-Task-Ins-Cubicle is equipped with scent material, to be able to adjust the scent corresponding to the scent at the remote site. These are such as see-shore-smell, flower-types etc. . . .

J. Related Other Definitions

5D Concept:

3D is to have the vision and sound all around, from the remote Cubicle.

4th D is to have the same environmental conditions as the remote Cubicle. For example same temperature and light situations such as "sun light".

5th Dimension is to interact with the remote environments.

Interactions at the remote site can be with various interfaces. For example it can be the ability to control remote environment devices of any kind.

There are also the interactions with other people at the remote site. I.e. Talking, Walking, Feeling together!

There are also the interactions with a Virtual World!

Invisible Walls:

Although there is no immediate usage in it, it is possible to connect Local-Task-Ins-Cubicle to itself as for Remote-Task-Ins-Cubicle too. As a result of this, the person inside the Task-Ins-Cubicle shall be visible within the same room from outside. This means the solid-walls constructed with double monitors shall appear to be "invisible". This looped-back function shall be used for functional testing of the Task-Ins-Cubicle.

Both Ways Virtual Transportation

A full Task-Ins-Cubicle can function as a Local-Task-Ins-Cubicle for "virtual transportation" to another Remote-Task-Ins-Cubicle and at the same time as a Remote-Task-Ins-Cubicle for another "local" Task-Ins-Cubicle somewhere else.

The result of this both ways virtual transportation could appear like "magic". For example a person can walk in the Local-Task-Ins-Cubicle but short after another person or thing can appear inside, as seen from outside within the room.

Terms Used within this Invention

TABLE 01

| Terms | Type | Short Explanation |
|---|---|---|
| | Terms used within this invention | |
| Local-Task-Ins-Cubicle | Device | Cubicle where the real persons or things are inside and where the real world of a Remote-Task-Ins-Cubicle or a virtual world will appear all around inside the Cubicle. |
| Remote-Task-Ins-Cubicle | " | Cubicle where persons or things appear virtually. |
| Task-Ins-Cubicle | " | A cubicle which can act as both Local-Task-Ins-Cubicle and as Remote-Task-Ins-Cubicle. |
| Task-Ins-Node | " | A variant of Remote-Task-Ins-Cubicle without external monitors and relatively very much smaller in size. |
| Task-Ins-Eye-Cubicle | " | A small all around Local-Task-Ins-Cubicle only around Head and instead of complete round monitors, monitors only within the visible area. In addition to full functionality of Task-Ins-Cubicle, there is an additional compass to detect the direction of the head and update video and audio accordingly.<br>It is in general a variant of Local-Task-Ins-Cubicle with limited monitors and with display synchronised with the head-movements i.e. compass values. |
| Inside-Control-Console | " | A control panel inside the Cubicle to do controlling of the Cubicle, such as switching on/off, accepting incoming calls, to be able to select an AV-Control source to connect to it and to be able to communicate with internet-portals; and to be able to send and receive control commands, and for these purposes to produce Task-Ins-Control Information. |
| Outside-Control-Console | " | Similar to Inside-Control-Console, except this is outside. |
| Task-Ins-Multiplexer | " | It multiplexes all the video input from cameras or from many light-detection-points respectively, all the audio input from microphones, all the control information from Task-Ins-Sensors and all the control information from Control-Consoles in the media format defined with Task-Ins-AV-Control. |
| Task-Ins-De-Multiplexer | " | It de-multiplexes a received multiplexed multi-media in the Task-Ins-AV-Control format and distributes video to the corresponding monitors, audio to the corresponding speakers, control to the corresponding control element. |
| Task-Ins-Mapper | " | It maps an external any known audio, video input source to a virtual screen within the active Task-Ins-Media. |
| Task-Ins-Converter | " | It converts an external any known audio, video input source to a Task-Ins-Media, i.e. depending on the conversion request either to Task-Ins-Inside-AV-Control or Task-Ins-Outside-AV-Control. |
| Task-Ins-Sensors | | Task-Ins-Hardware is equipped with several sensors such as climate information detection (temperature, humidity, wind etc.), light density, Location Info (for example GPS), movement direction, speed, scent detection and similar. The Task-Ins-Sensor results are added to the "control" part of the Task-Ins-AV-Control generated at the Task-Ins-Hardware. |
| Task-Ins-AV-Control | Media-Format | Multi-Media Format used by Task-Ins-Hardware, including multiplexed video (Task-Ins-Video), multiplexed audio (Task-Ins-Audio) and multiplexed control (Task-Ins-Control) |
| AVC | Media-Format | Audio, Video, Control |
| Task-Ins-Video | Media-Format | Video part of Task-Ins-AV-Control |
| Task-Ins-Audio | Media-Format | Audio part of Task-Ins-AV-Control |
| Task-Ins-Control | Media-Format | Control part of Task-Ins-AV-Control |
| Task-Ins-Inside-AV-Control | Media-Format | Multiplexed video, audio and control from internal/inside of a Task-Ins-Cubicle. |
| Task-Ins-Inside-Video | Media-Format | Video part of Task-Ins-Inside-AV-Control |
| Task-Ins-Inside-Audio | Media-Format | Audio part of Task-Ins-Inside-AV-Control |
| Task-Ins-Inside-Control | Media-Format | Control part of Task-Ins-Inside-AV-Control |
| Task-Ins-Outside-AV-Control | Media-Format | Multiplexed video, audio and control from outside of a Task-Ins-Cubicle, or outside of a Task-Ins-Node. |
| Task-Ins-Outside-Video | Media-Format | Video part of Task-Ins-Inside-AV-Control |
| Task-Ins-Outside-Audio | Media-Format | Audio part of Task-Ins-Inside-AV-Control |

TABLE 01-continued

Terms used within this invention

| Terms | Type | Short Explanation |
|---|---|---|
| Task-Ins-Outside-Control | Media-Format | Control part of Task-Ins-Inside-AV-Control |
| AV-Slide-Control | Media-Format | Control part of Task-Ins-AV-Control to shift the display of monitors to a given direction and in a given degree, for example to the right, to the left, upwards or downwards. Similarly the audio sound shall be shifted in the given direction, i.e. by directing to different speakers and by changing ins volume in correspondence to this direction change. |
| Task-Ins-Media | Media-Format | Offline virtual media provided by Task-Ins-Portal in Task-Ins-Inside-AV-Control format or as Task-Ins-Outside-AV-Control format. Task-Ins-Media is categorized as Task-Ins-Offices, Task-Ins-Cinema, Task-Ins-Scenes, Task-Ins-Films, and Task-Ins-Games. |

Interesting Usage Scenarios:

Task-Ins-Cubicle is indeed a complete one solution for multi-usage at home and for multi-usage for work. Following usage story is a good example for the future.

Morning after breakfast the man goes into the Task-Ins-Cubicle and starts his favorite Task-Ins-Media for Work Office, with his own selected 3 big monitors and his PC starts displaying output in these big displays. His selected office is next to a see-site, with surfers and swimmers. The woman goes to the control console outside and connects to the market of her choice and types the category. The things she wants to check with starts appearing in a holographic view within the same Task-Ins-Cubicle where her husband is currently working. She selects the items she wants through the console and puts them into the online-shopping-basket. Shortly after midday, the things get delivered. At this point, the man inside wants to make a meeting with a partner and makes a call to him with the control console inside. Upon acceptation of the call, he is virtually at the same place as his work partner and they start discussing about the work. The woman outside the cubicle wants to invite a friend to the house and she makes a call from outside the cubicle. Upon accepting the call the friend appears virtually within the room and they start conversation, drinking coffee and eating cakes too (but of course their own). The man inside is finished with the conversation of his work partner and returned back to his virtual office. He know wants to see TV on one of the monitors and selects this on the control console inside and TV appears on one of the 3 big screens. The woman wants to see a film and goes to the console outside and selects DVD with Task-Ins-Inside-AV-Control to play. It appears in a 3D holographic view at the Task-Ins-Cubicle. Now at the end of the day, both the man and the woman want to lie down together inside the Cubicle and make a tour to the Mars. They select the corresponding stored Task-Ins-Media with Task-Ins-Outside-AV-Control and start enjoying their life. At this moment the children are at home and they want to play a game designed for Cubicle-Outside. So they start the program from the control console outside and from the storage device select the Task-Ins-Game with the Task-Ins-Inside-AV format and start playing with the holographic views of the game. Now at this moment, the man and the woman want to visit a concert hall. They check the programs from the control console and select one. Immediately they find themselves in a concert hall, currently Beethoven is playing. They are slightly late and ask the people sitting near by if they have missed too much. Upon hearing not really they are satisfied and follow the wonderful music of Beethoven.

"fish-eye" and inner concave objectives on the cameras: The objectives of cameras inside Task-Ins-Cubicle are in a fish-eye i.e. convex "round form". In fact the form is adjusted according to the form and position of corresponding monitor of a camera. I.e. each camera inside provides video info to a certain numbered monitor outside. Vice versa each camera outside provides video info to a certain numbered monitor inside. The cameras outside are equipped with either concave formed objectives or to compensate the picture distortions arising from inner- or outer-convex nature of monitors. The shape of the objectives is also very critical to give a deepness effect on the pictures, movements displayed.

Optionally the pictures can be collected from "light-detection-points", in which case no additional picture compensation shall be needed.

Again optionally the compensation due to convex and concave nature of screens can be handled when needed with Software Solutions.

The invention claimed is:

1. An apparatus comprising:
a first cubicle in a spherical or cylindrical form, said first cubicle equipped with at least one first interior camera located on an interior of said first cubicle and at least one first interior monitor located on an interior of the first cubicle; and
a second cubicle in a spherical or cylindrical form, said second cubicle including at least one second external camera located on an exterior of said second cubicle and at least one second external monitor located on an exterior of said second cubicle;
wherein said at least one first interior monitor is configured to display video from said at least one second external camera which provides real-time perspective views of persons or things located external to the second cubicle on said at least one first interior monitor, such that the persons or things located external to the second cubicle appear virtually within the first cubicle; and
wherein said at least one second external monitor is configured to display video from said at least one first interior camera which provides real-time perspective views of persons or things located in the interior of the first cubicle on said at least one second external monitor, such that the persons or things located in the interior of the first cubicle appear virtually on the exterior of the second cubicle;

wherein each monitor is associated with at least a camera, at least a microphone and at least a speaker.

2. The apparatus of claim 1, wherein the first cubicle comprises at least one concave monitor for displaying images inside the first cubicle.

3. The apparatus of claim 1, wherein the first cubicle includes at least one convex monitor for displaying images outside the first cubicle.

4. The apparatus of claim 1, wherein each monitor is associated with a camera, a microphone and a speaker.

* * * * *